United States Patent
Grossman

(10) Patent No.: US 7,474,624 B2
(45) Date of Patent: Jan. 6, 2009

(54) METHOD AND APPARATUS FOR REDUCING DELAY JITTER

(75) Inventor: Daniel B. Grossman, Norwood, MA (US)

(73) Assignee: Motorola, Inc., Schaumburg, IL (US)

( * ) Notice: Subject to any disclaimer, the term of this patent is extended or adjusted under 35 U.S.C. 154(b) by 1013 days.

(21) Appl. No.: 10/447,796

(22) Filed: May 29, 2003

(65) Prior Publication Data

US 2004/0240438 A1     Dec. 2, 2004

(51) Int. Cl.
*H04J 3/06*     (2006.01)
*H04J 3/14*     (2006.01)
*H04L 12/26*     (2006.01)
*H04N 7/173*     (2006.01)

(52) U.S. Cl. ............. 370/252; 370/516; 375/371; 348/397; 725/114; 725/144

(58) Field of Classification Search ........... 370/252, 370/516; 375/371; 348/397; 725/114, 144
See application file for complete search history.

(56) References Cited

U.S. PATENT DOCUMENTS

| | | | | | |
|---|---|---|---|---|---|
| 4,894,823 | A * | 1/1990 | Adelmann et al. | ........... | 370/252 |
| 5,260,935 | A * | 11/1993 | Turner | ........... | 370/394 |
| 5,287,182 | A * | 2/1994 | Haskell et al. | ........... | 348/500 |
| 5,790,543 | A * | 8/1998 | Cloutier | ........... | 370/252 |
| 5,805,602 | A * | 9/1998 | Cloutier et al. | ........... | 370/516 |
| 6,259,677 | B1 * | 7/2001 | Jain | ........... | 370/252 |
| 6,360,271 | B1 * | 3/2002 | Schuster et al. | ........... | 709/231 |
| 6,452,950 | B1 * | 9/2002 | Ohlsson et al. | ........... | 370/516 |
| 6,487,603 | B1 * | 11/2002 | Schuster et al. | ........... | 709/231 |
| 6,507,592 | B1 * | 1/2003 | Hurvig et al. | ........... | 370/503 |
| 6,512,761 | B1 * | 1/2003 | Schuster et al. | ........... | 370/352 |
| 6,657,983 | B1 * | 12/2003 | Surazski et al. | ........... | 370/337 |
| 6,735,213 | B2 * | 5/2004 | Speciner | ........... | 370/412 |
| 6,775,301 | B1 * | 8/2004 | Kroll et al. | ........... | 370/516 |
| 6,859,460 | B1 * | 2/2005 | Chen | ........... | 370/412 |
| 6,862,298 | B1 * | 3/2005 | Smith et al. | ........... | 370/516 |
| 6,944,174 | B1 * | 9/2005 | Chow | ........... | 370/413 |
| 6,996,626 | B1 * | 2/2006 | Smith | ........... | 709/232 |
| 7,006,511 | B2 * | 2/2006 | Lanzafame et al. | ........... | 370/412 |
| 7,031,306 | B2 * | 4/2006 | Amaral et al. | ........... | 370/389 |
| 7,043,651 | B2 * | 5/2006 | Aweya et al. | ........... | 713/400 |
| 7,191,355 | B1 * | 3/2007 | Ouellette et al. | ........... | 713/400 |
| 7,289,506 | B1 * | 10/2007 | Hannuksela | ........... | 370/394 |
| 2001/0012300 | A1 * | 8/2001 | Raisanen | ........... | 370/429 |
| 2002/0131386 | A1 * | 9/2002 | Gwon | ........... | 370/338 |
| 2002/0167911 | A1 * | 11/2002 | Hickey | ........... | 370/252 |
| 2002/0194065 | A1 * | 12/2002 | Barel et al. | ........... | 705/14 |
| 2003/0202528 | A1 * | 10/2003 | Eckberg | ........... | 370/412 |

* cited by examiner

*Primary Examiner*—Alpus H Hsu

(57) ABSTRACT

Elastic buffering takes place within a head end terminal (200). An elastic buffer (206) has the effect of shifting time at its output frame-of-reference backward by a fixed amount to compensate for unknown time differences between time at its input frame-of-reference and time at the frame-of-reference of a remote node (150). The amount of time that the elastic buffer (206) shifts data is determined by a time-stamping technique, where data packets are time stamped at the remote node (150) and the time stamp is analyzed at the head end terminal (200) to determine the time shift.

11 Claims, 6 Drawing Sheets

100

METHOD AND APPARATUS FOR REDUCING DELAY JITTER

FIELD OF THE INVENTION

The present invention relates generally to cable-television systems and packet switched networks and in particular, to a method and apparatus for reducing delay jitter in such cable-television systems and packet switched networks.

BACKGROUND OF THE INVENTION

Modern cable-television systems tend to use the return path (i.e., subscriber unit to head end communication) inefficiently. Specifically, since subscriber units (such as set-top boxes and two-way cable ready television sets) transmit messages infrequently, the aggregate channel is lightly utilized. In typical existing systems, there is no opportunity to take advantage of unutilized capacity for other purposes, i.e. by taking advantage of statistical gain. However, new architectures are emerging that incorporate packet switched networks (such as Internet Protocol, Asynchronous Transfer Mode or Ethernet based networks) into the access network for the general purpose of carrying packet-based services, such as Internet access, telephony, and network management. It is highly desirable to also carry subscriber unit return traffic over the same packet switched network, thereby making more effective use of expensive facilities such as optical fibers.

It should be noted that these packet switched networks often do not transport a common timing reference, as do circuit transmission systems such as SONET. Thus, systems attached to them do not have a common time base or frequency reference.

Prior art techniques exist for efficiently transporting return signals for cable television systems over a packet network. For example, U.S. Pat. Ser. No. 10/162,461, entitled SYSTEM FOR RETURN BANDWIDTH MINIMIZATION USING SELECTIVE SAMPLING, by Smith, et al., describes a system for efficiently transporting return signals for cable television systems over a packet switched network. Smith et al., teaches a system that comprises a plurality of subscriber units, a plurality of nodes, a packet network, and a head end terminal. Subscriber units occasionally send a message in the form of a burst of modulated signal over a channel to a node. In a node, a selective sampler samples an upstream channel and discriminates valid signal from noise and idle channel conditions in the sample stream. A packetizer and packet forwarder packetizes and forwards samples representing a valid signal burst over the packet switched network to the head end terminal. The head end terminal depacketizes samples and converts them back to an analog broadband signal, which is transmitted over a coaxial cable to a demodulator. The demodulator processes signal bursts from the channel, and forwards the resulting messages into the interactive television system's head end infrastructure.

The above system does provide for a system for communicating over a packet switched network, when a polled or Aloha media access control (MAC) layer, such as that defined in American National Standard ANSI/SCTE 55-1 (2002), is used. If instead a time-division multiple access (TDMA) MAC, such as that defined in American National Standard ANSI/SCTE 55-2 (2002), is utilized, the system becomes highly sensitive to delay jitter. A TDMA system has a frame structure composed of fixed length time slots. A subscriber unit may transmit only at the beginning of a time slot which has been assigned to it by the interactive television system using a Media Access Control protocol. Each subscriber unit must know (e.g., to within 1.5 symbol times) the beginning time of each frame and slot, so that it may transmit only when it is allowed to do so, taking into account differing propagation delays between each subscriber unit and the head end. A ranging offset, which is determined by a feedback control loop, is added to a local clock at each subscriber unit, where the ranging offset is equal to the fixed delay between the STB and the head end. The feedback control loop is designed to compensate for long term variation in delay, such as might result from clock drift or thermal expansion and contraction of outdoor cables. However, it cannot compensate for delay jitter, as occurs due to effects of scheduling and blocking in packet switched networks. Thus, any system that inserts a packet switched network into the return path without compensating for delay jitter will cause instability in a TDMA system, rendering it non-functional. Therefore, a need exists for a method and apparatus for reducing delay jitter within cable television systems employing a TDMA system protocol.

DETAILED DESCRIPTION OF THE DRAWINGS

Figure 1:
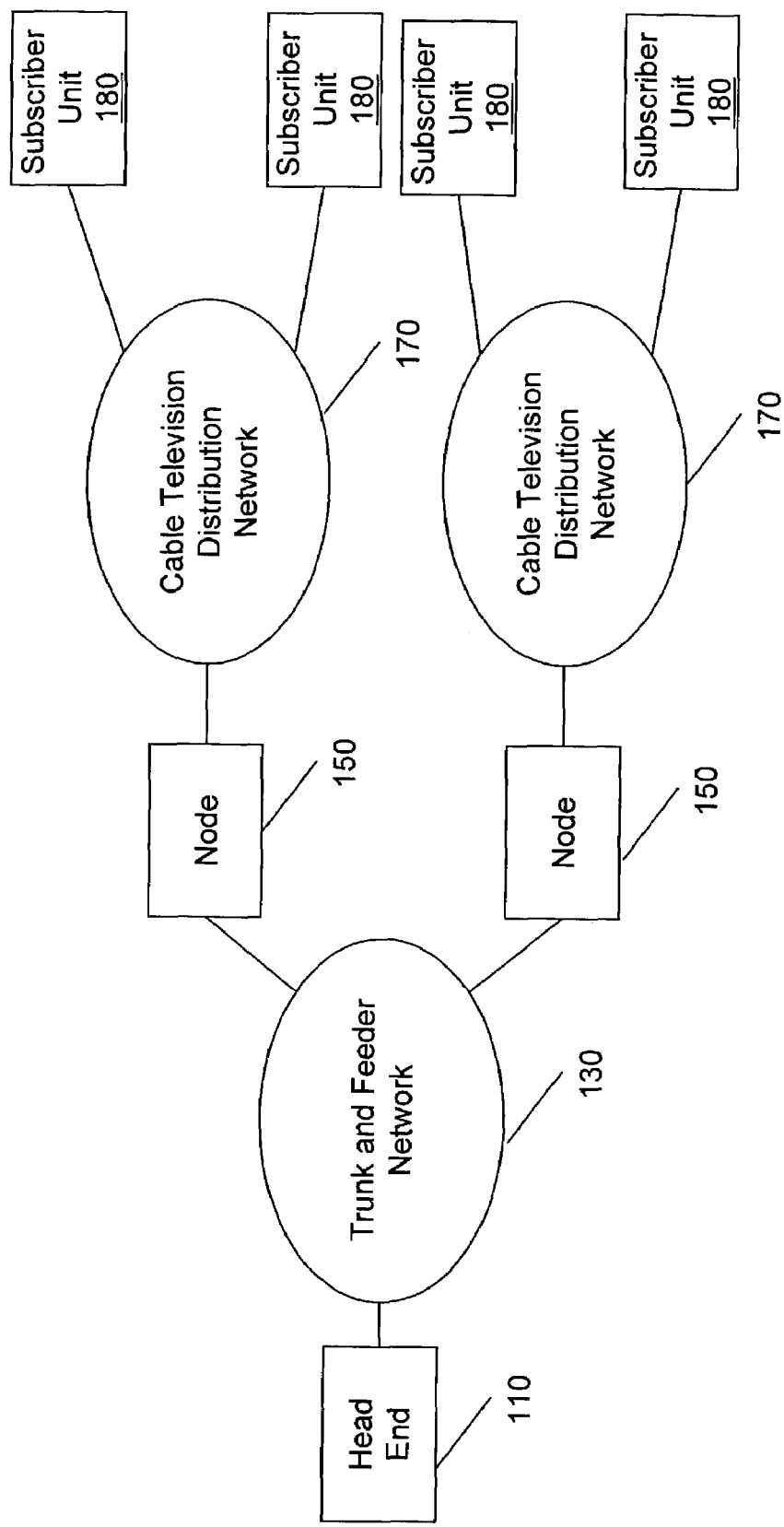
FIG. 1 is a block diagram of a cable television system in accordance with the preferred embodiment of the present invention.

To address the above-mentioned need, a method and apparatus for reducing delay jitter is provided herein. In particular, elastic buffering takes place within a head end. An elastic buffer has the effect of shifting time at its output frame-of-reference backward by a fixed amount to compensate for unknown time differences between time at its input frame-of-reference and time at the frame-of-reference of a remote node. The fixed amount of time that the elastic buffer shifts data is determined by a time-stamping technique, where data packets are time stamped at the remote node and the time stamp is used at the head end terminal to calculate a play out time that determines the time shift.

The present invention encompasses a method comprising the steps of receiving a first plurality of packets from a remote source, wherein each packet within the first plurality of packets is time stamped. A time of reception is determined for each packet within the first plurality of packets and the time stamp is compared with the time of reception for each packet within the first plurality of packets to produce a comparison that will be used to adjust a play out time through an elastic buffer in order to reduce delay jitter.

The present invention additionally encompasses a method comprising the steps of receiving a plurality of packets from a remote source, and delaying the plurality of packets by routing the plurality of packets through an elastic buffer, wherein the elastic buffer has a play out time that was previously determined based on a difference between a time stamp on a prior-received packet and a time of reception of the prior-received packet.

The present invention additionally encompasses an apparatus comprising means for receiving a first plurality of packets from a remote source, wherein each packet within the first plurality of packets is time stamped, means for determining a time of reception for each packet within the first plurality of packets, means for comparing the time stamp with the time of reception for each packet within the first plurality of packets, and based on the comparisons, means for adjusting a play out time through an elastic buffer in order to reduce delay jitter.

The present invention additionally encompasses an apparatus comprising means for receiving a plurality of packets from a remote source, and an elastic buffer for delaying the plurality of packets received from the remote source, wherein the elastic buffer has a play out time determined based on a at least one difference ($\Delta_i$) between a time of reception of, and a time stamp existing within, at least one previously transmitted packet.

Finally, the present invention encompasses an apparatus comprising means for transmitting a plurality of packets and means for time-stamping the plurality of packets, wherein the time-stamping of the packets causes an elastic buffer to delay the plurality of packets, wherein the elastic buffer has a play out time determined based on a plurality of differences ($\Delta_i$) between a time of reception of, and a time stamp existing within, a plurality of previously transmitted packets.

Turning now to the drawings, wherein like numerals designate like components, FIG. 1 is high level block diagram of a subscriber access network 100 in accordance with the preferred embodiment of the present invention. Network 100 comprises a headend 110 in communication with trunk and feeder network 130 for transmitting a plurality of signals and receiving a plurality of signals. A headend is a structure in a cable television network that contains transmission, switching, video distribution, services management and other equipment; other terms of art, such as central office, are also used to denote such a structure. Note that some cable television networks distribute headend functions among multiple physical locations.

One or more nodes 150 are connected to trunk and feeder network 130 for distributing communications services over cable television distribution network 170. Nodes 150 may be located in a utility area of a multiple dwelling unit, in a curbside pedestal, outside the minimum point-of-entry of a detached dwelling or at another location which is convenient to the network operator. Subscriber locations are connected by drop cables to cable television distribution network 170 for receiving the communications services distributed by cable television distribution network 170. Each subscriber location has a premises wiring network and has one or more subscriber unit 180. For example, a subscriber unit may be a set-top box (STB), which mediates user access to interactive television services, or a television set which contains set-top box functions. Nodes 150 function to both distribute signals in the downstream direction to, and collect upstream signals from, subscriber units 180 and communicate them to headend 110 via trunk and feeder network 130. In a preferred embodiment, the trunk and feeder network is an optical network. In the preferred embodiment of the present invention nodes 150 and head end 110, and subscriber units 180 do not have reference to a common time base.

Advantageously, headend 110 is configured, in part, to execute a variety of network physical management functions, including controlling access to the physical medium of the return path of the cable television distribution network 170. Network 100 employs a TDMA protocol for packet transmission from subscriber units 180 to head end 110 and a TDM protocol for packet transmission from head end 110 to subscriber units 180. More particularly, when subscriber unit 180 desires to transmit packets to head end 110, subscriber unit 180 is assigned a time slot for transmission of the packet. This is consistent with a cable television system which is well-known in the art, wherein modulated packets transmitted by the subscriber units over a pre-determined radio frequency channel are combined in the electrical domain, using a network of splitter/combiners. As discussed above, subscriber unit 180 may transmit only at the beginning of a time slot which has been assigned to it. Each subscriber unit 180 must know (e.g., to within 1.5 symbol times) the beginning time of each frame and slot, so that it may transmit only when it is allowed to do so, taking into account differing propagation delays between each subscriber unit 180 and head end 110. Therefore, very precise synchronization must be maintained between head end 110 and subscriber units 180, so that combining of packets from a plurality of subscriber units may take place in the packet domain rather than in the electrical domain.

In order to accomplish this synchronization, elastic buffering takes place within head end 110. An elastic buffer has the effect of shifting time at its output frame-of-reference backward by a fixed amount to compensate for unknown time differences between time at its input frame-of-reference and time at the frame-of-reference of the subscriber. In the preferred embodiment of the present invention the fixed amount of time that the elastic buffer shifts data is determined by a time-stamping technique, where data packets are time stamped at the subscriber units and the time stamp is analyzed at head end 110 to determine the time shift.

Figure 2:
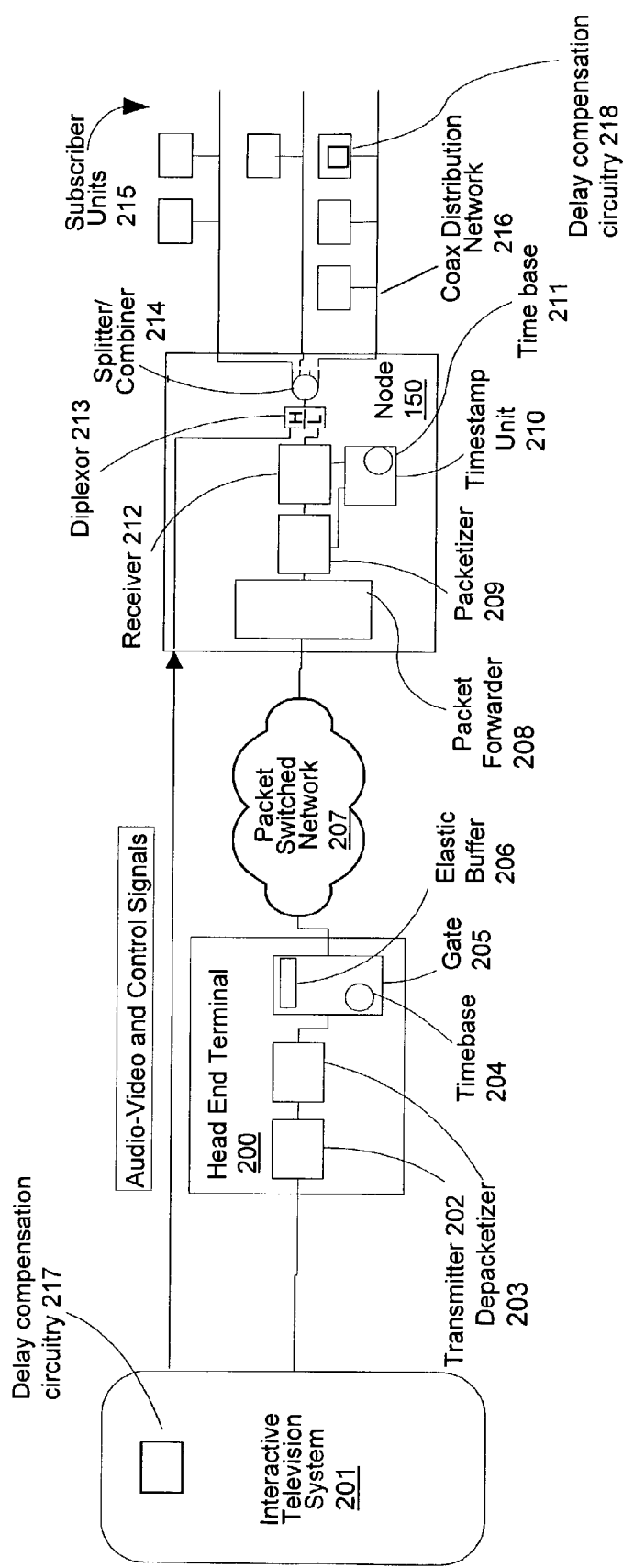
FIG. 2 is a more-detailed block diagram of the cable television system of FIG. 1 in accordance with the preferred embodiment of the present invention.

FIG. 2 is a more-detailed block diagram of network 100 of FIG. 1. As is evident, head end terminal 200, which is located in head end 110, comprises transmitter 202, de-packetizer 203, time base 204, gate 205, and elastic buffer 206. A plurality of nodes 150 (one shown) are connected to a plurality of subscriber units 180 by coaxial cable distribution network 216. In the return path, subscriber units 215 communicate with an interactive television system using a TDMA protocol, transmitting messages by modulating them onto a return channel having a pre-determined center frequency. Each node contains means for receiving packets (receiver 212) which processes the signal on the return channel, and extracts message bursts, e.g., as digital samples of the composite modulated signal or as groupings of bits demodulated from the composite signal. A time-stamp unit 210, which is coupled to receiver 212, contains a free-running, high quality time base (clock) 211 operating at a high rate relative to receiver 212. Packetizer 209 is coupled with both receiver 212 and time-stamping unit 210, and is further coupled with packet forwarder 208. Packet forwarder 208 attaches node 150 to packet switched network 207. At head end terminal 200, which is also attached to packet switched network 207, gate 205 contains elastic buffer 206 and free-running, high quality time base (clock) 204 which runs at the same nominal frequency as time base 211 in nodes 150. Although time base 211 and time base 204 may be traceable to a common time reference, as is known in the art, they need not be, and no advantage is obtained if they are. Gate 205 is coupled to de-packetizer 203, which is further coupled to transmitter 202. Transmitter 202 may, for example, produce an RF signal identical to the composite modulated signal sent by an STB, or it may produce a bit stream (i.e., as baseband digital signals) or it may produce signals in some intermediate form. In any case, the signals are transmitted so as to exactly fit into the timeslot in which they were sent by the set-top box.

During operation, gate 205 must determine a play out time for the packet, taking into account the need to compensate for unknown and variable time differences between time at its input frame-of-reference and time at the frame-of-reference of the node 150. In order to accomplish this task, at node 150, timestamp unit 210 accesses time base 211 and time stamps all outgoing packets, where the timestamp is the exact arrival time of a sample (or bit) at a pre-determined position of the particular packet, in the frame-of-reference of node 150. In the preferred embodiment of the present invention this time stamping of outgoing packets comprises attaching a 32 bit binary number to the packet, representing the state of timebase 211 and thus comprising the time of arrival for the first sample (or bit) of the packet.

The timestamp is extracted by gate 205. Gate 205 then serves as means for determining play-out time, in the frame-of-reference of time base 204, based on the time stamp. Gate 205 then stores the packet in the elastic buffer 206 until the play-out time. More particularly, a difference A is added to the timestamp, which is added to a constant jitter buffering time, yielding a play out start time in the frame-of-reference of the headend terminal. In other words, elastic buffer 206 operates to delay packets through gate 205. This delay is adjustable (or elastic). By adjusting the delay of buffer 206 by the estimated difference existing between the time stamp and time base 204 added to a configurable fixed jitter buffering time, the unknown difference between the two time bases and the unknown variable delay in the packet network are compensated by the play out delay. Thus, the first sample (or bit) of the packet is played out by head end terminal 200 at a constant (but not pre-determined) time after it arrives at node 150.

Thus, in accordance with the preferred embodiment of the present invention, a method and apparatus is taught wherein head end terminal 200 determines the difference between a time base at its frame of reference and a time base at a node's frame-of-reference, using a series of time stamped packets sent by node 150. The precise difference between time bases at two frames-of-reference cannot be known using the system of this invention, because there is no common time base and because the amount of delay and delay jitter in transporting the time stamped packets is unknown. However, as long as the unknown difference between the time at node's frame of reference and the head end terminal's frame of reference remains constant over a long enough period of time, the sum of that difference and a predetermined play out delay (or elastic buffer) can be compensated by the TDMA system's ranging process. Specifically, as is known in the art, the delay compensation circuitry 218 in the subscriber units and the delay compensation circuitry 217 in the interactive television system 201 are coupled so as to adjust the local time at subscriber units 215. This adjustment compensates for any differences between the delays in the respective paths between the interactive television system 201 and each subscriber unit 215, and also to compensate for long-term changes in the delay, as might, for example, be caused by thermal expansion and contraction of cables in the coax distribution network 216. In the present invention, the delay compensation circuitry also corrects for any inaccuracy or relative drift in time base 211 and time base 204. Note, however, that delay compensation circuitry 218 and delay compensation circuitry 217 can compensate only for long-term changes in delay, and are not responsive to delay jitter.

Figure 3:
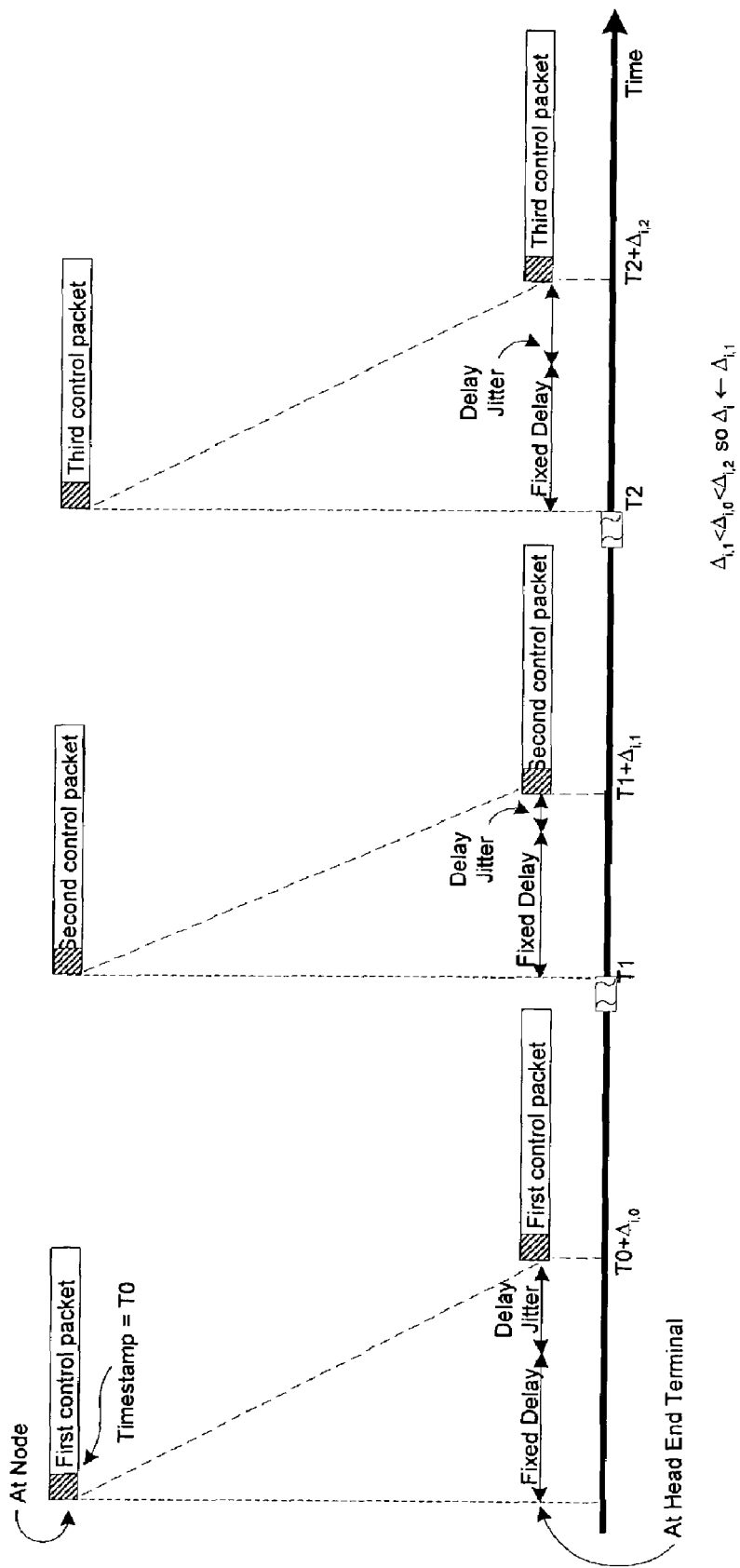
FIG. 3 and FIG. 4 illustrate time stamping in accordance with the preferred embodiment of the present invention.

In the preferred embodiment of the present invention the estimation of the difference, $\Delta$, between the time base 204 and the time base 211 is performed during a startup procedure. Headend terminal 200 and each node 150 have a fairly high quality, free running time base 204 and 211 operating at the same nominal frequency. FIG. 3 illustrates the estimation of the differences between timebase 204 and timebase 211, in accordance with the preferred embodiment of the present invention. Head end terminal 200 maintains a vector of variables $\Delta_i$, which is the estimated difference between its time base 204 and each node's time base 211. For notational convenience, each node is denoted by an integer i=0 . . . N, where N is the number of nodes in the network 100; thus $\Delta_i$, corresponds to the difference $\Delta$ as estimated for node i. Note that if the size, in bits, of time bases and timestamps is some pre-determined value k, all additions and subtractions are modulo $2^k$. In a preferred implementation, k=32. At startup (e.g., after power on), node 150 establishes a session to head end terminal 200. When the session has been established, node 150 sends a series of control packets to head end terminal 200, where each of the control packets contains a timestamp, (denoted as T0, T1, T2). Head end terminal 200 computes the difference between the arrival time of each control packet (denoted as $T0+\Delta_{i,0}$ . . . $T2+\Delta_{i,2}$), and the timestamp in the packet, and sets the value of $\Delta_i$ to the smallest value of $\Delta_i$ seen during the startup process (e.g., in the example of FIG. 3, to the value of $\Delta_{i,1}$). This value of $\Delta_i$ is taken as the sum of the difference between time bases 204 and 211 and an estimated fixed delay. The control packet that had the smallest difference was the one that experienced the least delay jitter (i.e., variable delay), and the difference was close to (but probably not equal to) the sum of the absolute differences between time bases 204 and 211 and the fixed delay. This removes unnecessary compensation.

Figure 4:
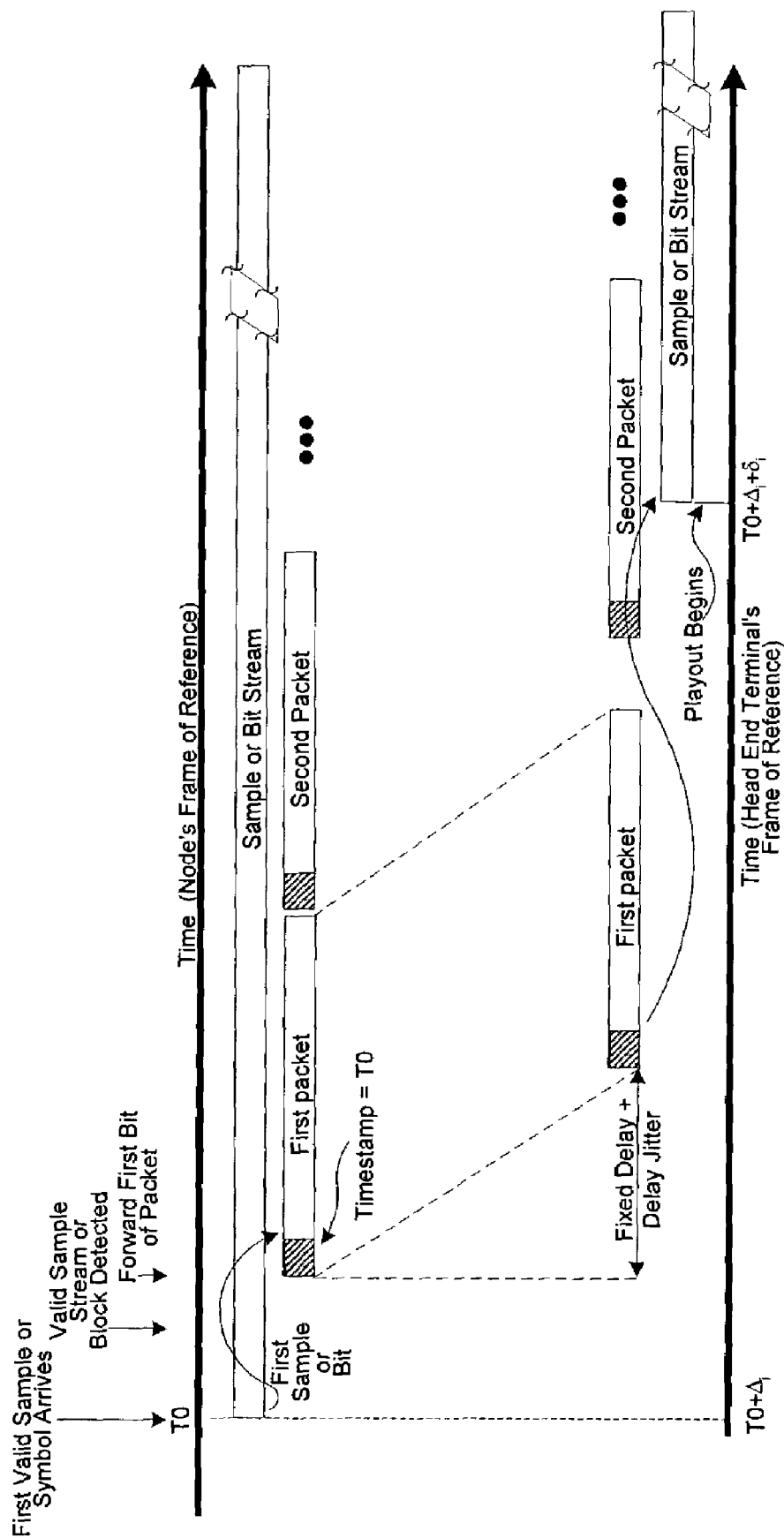

FIG. 4 illustrates the system's operational phase in accordance with the preferred embodiment of the present invention. During operation, at a time denoted as T0, receiver 212 detects a first sample or symbol, and then a subsequent stream of samples or symbols which comprise a message from subscriber unit 215. As shown, there may be some fixed delay between the time a sample (or symbol) arrives and the time that it is detected. Packetizer 209 packs samples (or octets which are demodulated from a symbol stream) into one or more packet. Timestamp unit 210 sets a timestamp equal to the value T0 in each packet to the value of time base 211 at a fixed offset from the time that the first sample was detected by receiver 212. Any non-deterministic delay in capturing the time base may cause the system to become unstable. In a preferred implementation, time base 211 will be latched on a known edge of the receiver's clock on a known symbol of the message, yielding T0, and the latched value copied into the packet. Packetizer 209 continues to pack samples (or octets) into the packet until the end of the signal burst, or until the packet contains a pre-determined maximum number of samples (or octets). Packet forwarder 208 then forwards the packet over the packet switched network 207 to head end terminal 200. Note that in some cases, a signal burst may contain more samples (or bits) than the pre-determined maximum number of samples (or octets); in this case, the packet becomes a first packet fragment, and packetizer 209 starts adding samples (or octets) to second packet fragment, and so on, until the end of the signal burst.

In the frame of reference of head end terminal 200, the instant of time T0—that is, the value of time base 204—has the value $T0+\Delta_i$. When gate 205 receives a packet, it does not play out the packet (or first received fragment of a packet) until its time base is equal to the sum of $\Delta_i$, the packet's timestamp and a configurable fixed jitter buffering time (which is configured to be a conservative estimate of the worst case jitter bound). As a result, play out will begin at exactly the arrival time at gate 205 of the first sample of the first packet fragment, offset by a constant time difference $\delta_i$. The value of $\delta_i$ is not known at either node 150 or at the head end, and would be difficult to measure. However, its value is not important to the operation of the system as long as it remains constant. Consider the following contrived numerical example, where the receiver is a selective sampler as taught in U.S. Pat. Ser. No. 10/162,461:

Suppose that the time bases have a frequency of 100 MHz (a period of 10 nS), and that real fixed delay in the network is 100 μs, or $10^4$ ticks. As it happened, the two time bases started exactly 1 ms apart in absolute time, so if we could sample them at exactly the same time, their difference would be $10^5$. The four control packets sent by node 150 at startup vary in arrival times at head end terminal 200 relative to their timestamps. The calculated values of $\Delta_i$ are 110,030, 110,008, 110,083 and 110,021, respectively. Head end terminal 200 selects a value of 110,008 for $\Delta_i$. It does not know that the components of $\Delta_i$ are the 100 μs fixed delay, the 1 ms difference in time base 211 and 80 ns of variable (queuing) delay. The pre-determined value of the jitter buffer is 500 μs.

Some time later, node 150 detects a valid signal. The signal detection algorithm operates over a window of 18 samples. Suppose that the sample rate is 500 kHz, or 20 time base ticks per sample. The receiver latches the value of the time base on the rising edge of the sample clock that collects the $20^{th}$ sample. 20*20=400 ticks are subtracted from this value and the result is put into the first fragment to be sent. For the sake of this discussion, latched timestamp value is 1,000,000. This means that the first sample was received at time 999600 in node 150's frame of reference. In head end terminal 200's frame of reference, the latched timestamp is at 1,110,008, and the first sample was received at 1,109,608, which is the value placed in the timestamp field of the packet.

The packet continues to be filled at the sample rate. For the sake of this discussion, the packet size is limited to 1000 samples. This means that the last sample of the packet is received in node 150's frame of reference at 1,019,600, or 200 μs after the first sample; this is the packetization delay. At this time, the packet is forwarded, and the selective sampler starts filling a next packet.

The fragment is forwarded through the network and experiences fixed and variable delays. Three cases are possible:

Case 1: the delay experienced by the packet is less than the sum of the delay components of $\Delta_i$ (i.e., is less than 100.08 μs—but it cannot be less than the fixed delay in the network, 100 μs)

Case 2: the delay experienced by the packet is greater than or equal to the sum of the delay components of $\Delta_i$, but less than the sum of the delay components of $\Delta_i$ and the jitter buffer minus packetization delay (i.e., is less than 400.08 μs).

Case 3: the delay experienced by the packet is greater than or equal to the sum the sum of the delay components of $\Delta_i$ and the jitter buffer minus packetization delay (i.e., is greater than or equal to than 400.08 μs).

Head end terminal 200 receives the packet fragment, takes the timestamp and converts it to its own frame of reference by adding $\Delta_i$. Recall that this value is 1,110,008. It adds the 500 μs jitter buffer delay, yielding the time that play out must start, which is 1,160,008, or 500 μs after the first sample was received, in both frames of reference. By reference to the cases for network delay above:

Case 1: the play out start time is in the future, in this case by a difference of greater than the jitter buffer minus the packetization delay. Head end terminal 200 holds the packet until the play out start time and then begins to play it out. Even though the variable delay experienced by the packet is less than the variable portion of $\Delta_i$, this deficit is corrected, and play out occurs exactly 500 μs after the first sample was received.

Case 2: the play out start time is in the future, in this case by a difference of less than the jitter buffer minus the packetization delay. This difference is in fact the delay experienced by the packet and the packetization delay, less the delay components of $\Delta_i$. Again, play out occurs exactly 500 μs after the first sample was received.

Case 3: the play out start time is in the past. The fragment and all succeeding fragments must be discarded.

As discussed above, and as is well known in the art, shortly after startup is complete, each subscriber unit will initiate ranging. Ranging adjusts the time base offset in the subscriber unit to compensate for fixed delays. When operated over the system of the present invention, those delays include $\delta_i$, in addition to the propagation and other fixed delays contemplated in the design of the TDMA system. As a result, both fixed and variable delays created by the packet switched network and other system components will be corrected out by TDMA ranging. Thus, a symbol sent by an STB at the beginning of a time slot in the STB's frame of reference will be received very close to the beginning of that time slot in the demodulator's frame of reference. This depends on the precision and drift of the time bases.

Note that the time base 211 and its operable coupling into the receiver 212 and packetizer 209 at node 150, and the time base 204 and its operable coupling to the de-packetizer 203 at head end terminal 200 will typically need to be implemented in hardware, to maintain strictly deterministic relationships between the time stamp, the signal detection at the receiver, and the signal output at the transmitter. Thus, in one possible embodiment of the present invention, de-packetizer 203 is implemented on a microprocessor (such as a Motorola MPC 8245), operably coupled to an Ethernet controller device using a PCI bus. Preferably, some output of the Ethernet controller device, such as the interrupt control line(s) or the receive LED driver, clocks a latch that captures the value of the time base when a bit at a precisely known position in the frame, such as the the last bit of first byte, is received. If the time base frequency is much greater than the sample or bit rate, a small number of ticks of uncertainty will be acceptable, but more than that must be avoided.

In a preferred implementation, the packet network is a managed Internet Protocol (IP) network and protocols standardized for the Internet are used. Packets are IP packets containing User Datagram Protocol (UDP) headers and the Real-time Transport Protocol (RTP). The timestamps described herein are contained in RTP headers. The control packets used during startup are in the format defined in the Real-time Control Protocol (RTCP). The use of these standard protocols (i.e. specific formats and protocol mechanisms used for communications between the node 150 and head end terminal 200) follow accepted practice.

In another preferred implementation, the packet network is a standardized Asynchronous Transfer Mode (ATM) network. The non-real time variable bit rate (nrt-VBR) service category is used in an ATM virtual channel connection from the node 150 to the head end terminal 200. As known in the art, nrt-VBR provides some bounds on delay jitter, but not enough to obviate the need for the present invention. Packets are ATM Adaptation Layer Type 5 Protocol Data Units (AAL5-PDUs) containing RTP headers. RTCP is used for control packets at startup. Again, use of standard protocols follows accepted practice and would be obvious to a practitioner skilled in the art.

Additionally, although the above description details an interactive television system, it could also be used for applications to include transport of Data over Cable Television Systems using the standardized DOCSIS specification and backhaul of wireless traffic, where the medium access protocol is TDMA.

Figure 5:
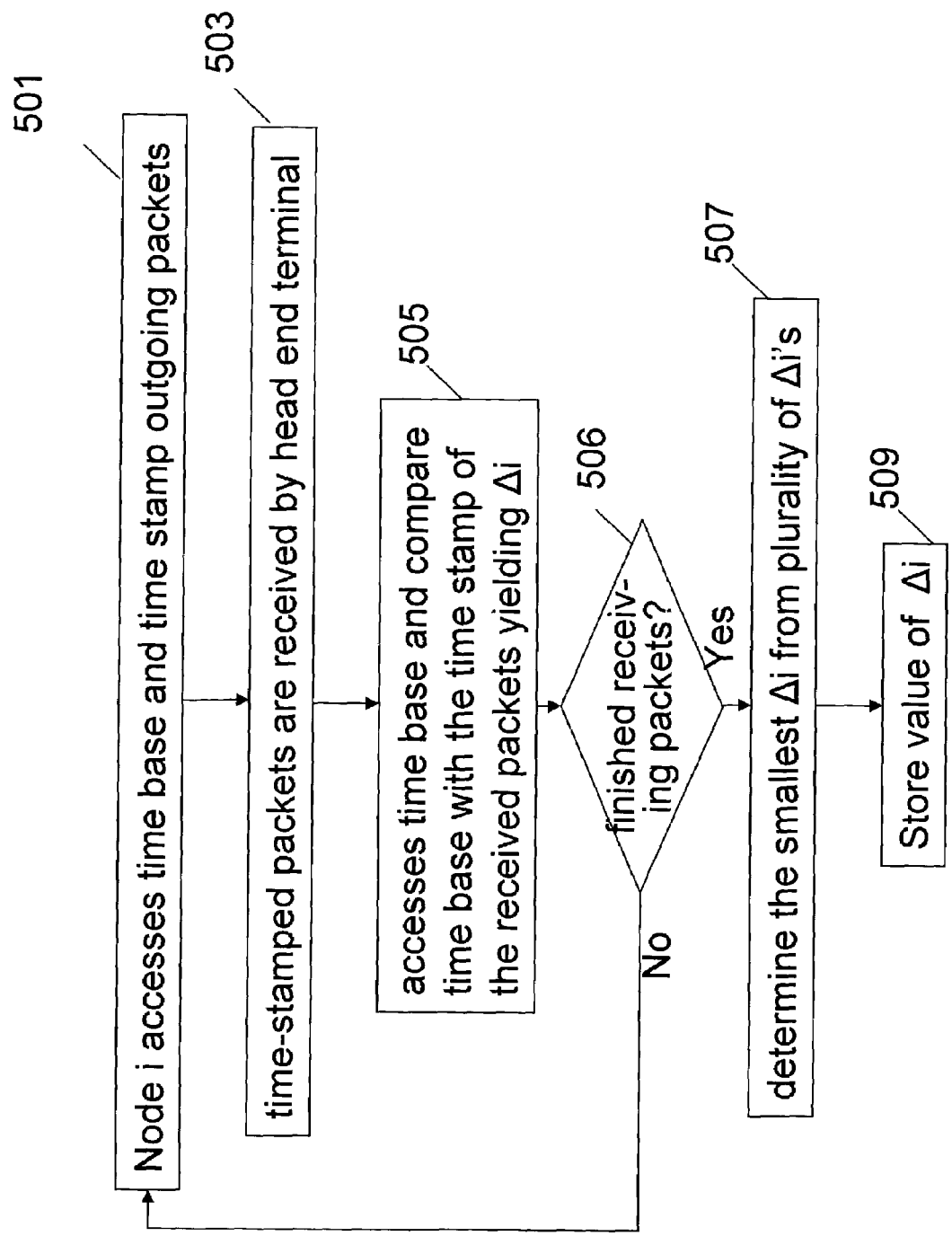
FIG. 5 is a flow chart showing operation of the system of FIG. 2 during system start up in accordance with the preferred embodiment of the present invention.

FIG. 5 is a flow chart showing operation of the system of FIG. 2 during system start up in accordance with the preferred embodiment of the present invention. The description that follows shows those steps necessary to estimate a difference between time base 211 and time base 204, as a necessary step in determining an adjustment to an elastic buffer in order to reduce delay jitter.

The logic flow begins at step 501 where time stamp unit 210 accesses time base 211 and time stamps a plurality of outgoing packets from node 150. At step 503, the time-stamped packets are received by head end terminal 200. Gate 205 accesses time base 204 and compares time base 204 with the time stamp of the received packets (step 505). In particular at step 505, a plurality of $\Delta_i$'s are determined, with each $\Delta_i$ being a difference between when a particular packet was received and the time stamp on the particular packet. At step 506, node 150 head end terminal 200 determines that it has finished receiving packets. At step 507, the smallest $\Delta_i$ from the plurality of $\Delta_i$'s is determined and at step 509, it is stored in a vector $\Delta$, where each entry i in $\Delta$ is associated with a particular node 150. As discussed above, the smallest $\Delta_i$ is an estimate of the difference between time base 211 and time base 204, as a necessary step in determining an adjustment to an elastic buffer in order to reduce delay jitter.

Figure 6:
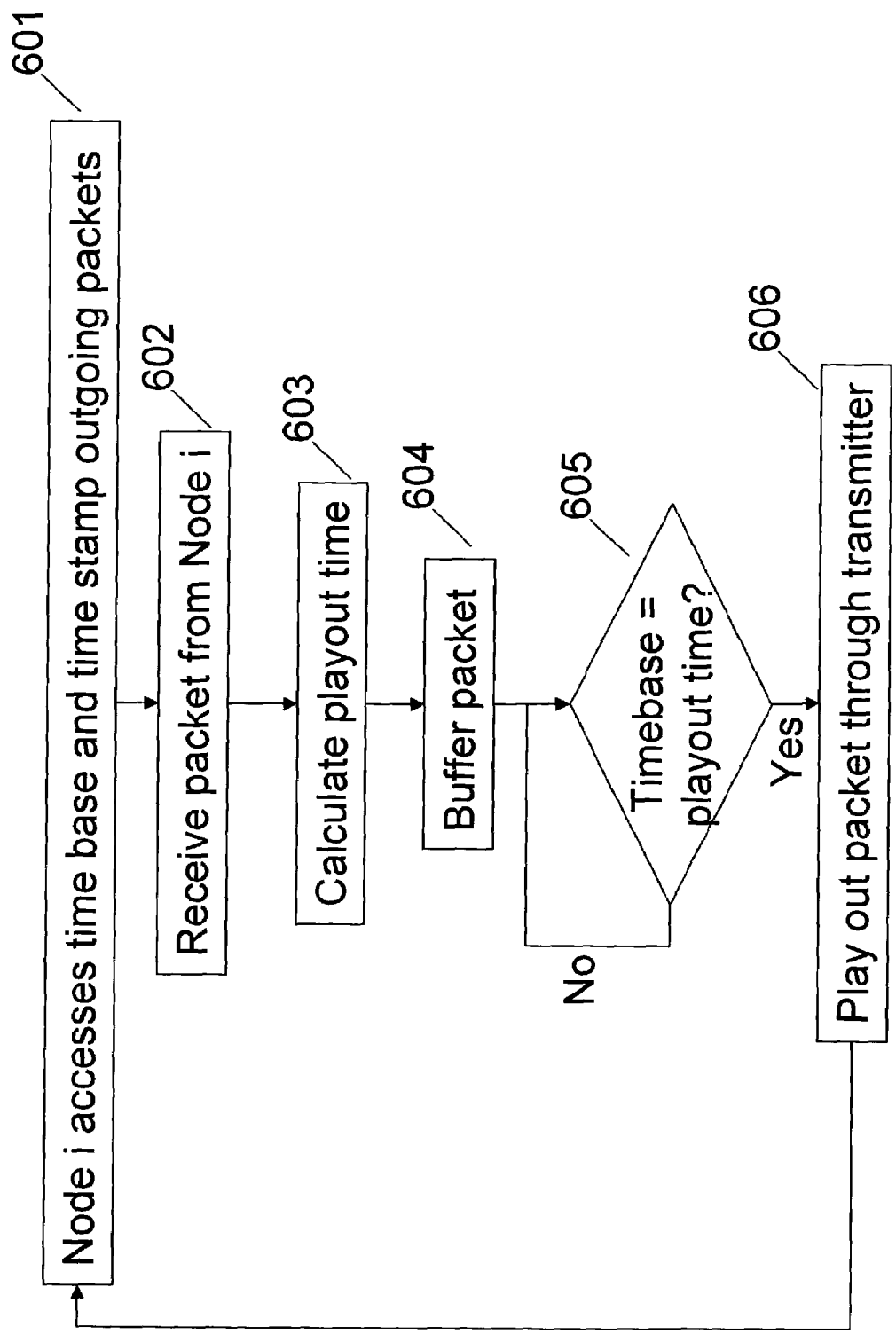
FIG. 6 is a flow chart showing operation of the system of FIG. 2 during non-system startup in accordance with the preferred embodiment of the present invention.

FIG. 6 is a flow chart showing operation of the system of FIG. 2 during normal operation in accordance with the preferred embodiment of the present invention. The logic flow begins at step 601 where the ith node 150 accesses its time base, denoted as T0 and timestamps an outgoing packet with the value T0. At step 602, head end terminal 200 receives a packet transmitted from the ith node 150. At step 603, $\Delta_i$ (i.e., the ith entry in vector $\Delta$) is retrieved, and the play out time $T_{playout}$ is calculated as T0+$\Delta_i$+the configurable fixed jitter buffering time. At step 604 the packet is buffered within buffer 206. At step 605, gate 205 waits until time base 204=$T_{playout}$. At step 606, the packet leaves buffer 206 and enters de-packetizer 203, where its contents are loaded at a pre-determined rate into transmitter 202. Steps 601 through 610 are repeated as long as the system is operational.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the steps of:
during an initial startup procedure, performing the steps of:
receiving a first plurality of packets from a remote source, i, wherein each packet within the first plurality of packets is time stamped;
determining a time of reception for each packet within the first plurality of packets;
comparing the time stamp with the time of reception for each packet within the first plurality of packets to produce a plurality of comparisons $\Delta_i$;
determining a smallest $\Delta_i$ from the comparisons;
after the initial startup procedure, performing the steps of:
receiving a second plurality of packets from the remote source, i, wherein each packet within the second plurality of packets is time stamped;
converting each time stamp on the second plurality of packets to the frame of reference of the receiver by adding the smallest $\Delta_i$ that was determined during the startup procedure to the time stamp;
determining a play out time from an elastic buffer based on the converted time stamps in order to reduce delay jitter.

2. The method of claim 1 wherein the step of receiving the first plurality of packets from the remote source comprises the step of receiving the first plurality of packets from a node within a subscriber access network.

3. The method of claim 2 wherein the step of receiving the first plurality of packets from the node comprises the step of receiving the first plurality of packets from the node, wherein the first plurality of packets are time stamped by the node.

4. The method of claim 1 wherein the step of determining the time of reception comprises the step of determining the time of reception utilizing an internal time base that is not referenced to any external time base.

5. The method of claim 1 wherein the step of comparing the time stamp with the time of reception comprises the step of determining a plurality of differences ($\Delta_i$) between the an internal time base and the time stamp for each packet within the first plurality of packets.

6. The method of claim 1 wherein the step of determining a play out time comprises the steps of:
adding the smallest $\Delta_i$ that was determined during the startup procedure to each timestamp to produce a modified time stamp; and
adding the modified time stamp to a constant jitter buffering time, yielding a play out start time.

7. An apparatus comprising:
means for receiving a first plurality of packets during an initial startup procedure from a remote source, wherein each packet within the first plurality of packets is time stamped;
means for determining a time of reception for each packet within the first plurality of packets;
means for comparing the time stamp with the time of reception for each packet within the first plurality of packets to produce a plurality of comparisons $\Delta_i$;
means for determining a smallest $\Delta_i$ from the comparisons;
means for receiving a second plurality of packets after the startup procedure from the remote source, wherein each packet within the second plurality of packets is time stamped;
means for converting each time stamp on the second plurality of packets to the frame of reference of the receiver by adding the smallest $\Delta_i$ determined during the startup procedure to the time stamp;
means for determining a play out time from an elastic buffer based on the converted time stamps in order to reduce delay jitter.

8. The apparatus of claim 7 wherein each packet within the first plurality of packets is received from a node within a subscriber access network.

9. The apparatus of claim 8 wherein the first plurality of packets are time stamped by the node.

10. The apparatus of claim 7 wherein the time of reception is determined by utilizing an internal time base that is not referenced to any external time base.

11. The apparatus of claim 7 wherein the plurality of comparisons ($\Delta_i$) comprise a plurality of differences ($\Delta_i$) between an internal time base and the time stamp for each packet within the first plurality of packets.

* * * * *